United States Patent [19]
Tsuji et al.

[11] Patent Number: 5,241,386
[45] Date of Patent: Aug. 31, 1993

[54] VIDEO SIGNAL GRADATION CORRECTOR PROVIDING SMOOTH CORRECTION WHILE AVOIDING OSCILLATION OF A CORRECTED OUTPUT LUMINANCE SIGNAL DUE TO NOISE AND ACHIEVING FAST RESPONSE TO SUDDEN VIDEO SCENE CHANGES

[75] Inventors: Toshiaki Tsuji; Atsuhisa Kageyama, both of Ibaraki, Japan

[73] Assignee: Matsushita Electric Industrial Co., Ltd., Osaka, Japan

[21] Appl. No.: 846,143

[22] Filed: Mar. 5, 1992

[30] Foreign Application Priority Data

Mar. 22, 1991 [JP] Japan ............................ 3-058657

[51] Int. Cl.$^5$ ...................... H04N 1/40; H04N 5/202
[52] U.S. Cl. .................................. 358/166; 358/458
[58] Field of Search ................. 358/160, 166, 37, 455, 358/458

[56] References Cited

U.S. PATENT DOCUMENTS

| | | |
|---|---|---|
| 3,979,555 | 9/1976 | Opittek et al. |
| 4,353,092 | 10/1982 | Bailey et al. |
| 4,639,783 | 1/1987 | Fling |
| 4,731,863 | 3/1988 | Sezan et al. ............... 358/455 X |
| 4,931,864 | 6/1990 | Kawamura et al. ........... 358/458 X |
| 5,053,888 | 10/1991 | Nomura ........................ 358/458 |

FOREIGN PATENT DOCUMENTS

| | | |
|---|---|---|
| 0205383 | 12/1986 | European Pat. Off. |
| 0258673 | 3/1988 | European Pat. Off. |
| 3126377 | 5/1991 | Japan |

Primary Examiner—Mark R. Powell
Attorney, Agent, or Firm—Stevens, Davis, Miller & Mosher

[57] ABSTRACT

In a video signal gradation corrector used in a television receiver, an output of a look-up table memory is supplied to a constant-multiplication circuit, an output signal of the constant-multiplication circuit and an output signal of a look-up table operating circuit are added by an adder, and the result of addition is set into the look-up table memory. Further, a video scene change detecting circuit is provided between an output terminal of the look-up table operating circuit and a coefficient control terminal of the constant-multiplication circuit, and a coefficient of the constant-multiplication circuit is changed in accordance with a change in video scene. Thereby, a correction is made which is not affected by noises, is stable and smooth, and follows the change in video scene.

4 Claims, 6 Drawing Sheets

VIDEO SIGNAL GRADATION CORRECTOR PROVIDING SMOOTH CORRECTION WHILE AVOIDING OSCILLATION OF A CORRECTED OUTPUT LUMINANCE SIGNAL DUE TO NOISE AND ACHIEVING FAST RESPONSE TO SUDDEN VIDEO SCENE CHANGES

BACKGROUND OF THE INVENTION

The present invention relates to a gradation corrector used in correcting the gradation of a video signal in a television receiver, a video tape recorder or the like.

In recent years, great importance has been attached to a gradation corrector in order to provide a more clear image which is required with the increase in size of a color television receiver and the improvement in image quality thereof, and more especially, in order to expand the dynamic range of an image on a CRT by passing a video signal through a non-linear amplifier to correct the gradation of the video signal.

The present application is a parallel application Ser. No. 07/838,844 filed Feb. 21, 1992, with a preceding U.S. application entitled "Gradation Corrector" and filed by the present inventors on the basis of Japanese Patent Application No. 03-032792 and assigned to the same assignee with the present application. Both applications relate to improvements on gradation correctors and they are adapted to prevent correction oscillations due to noise and prevent response delays in sudden changes in video scene by detecting changes in the scene. In order for the improvement, the present improvement relies on a use of a recursive filter for flattening data stored in a histogram memory or data stored in a look-up table memory. The improvement by the preceding application invention relies on an arrangement of preventing oscillations of one of parameters used in histogram data conversion process which one parameter is of more significant influence to a resultant correction data.

Figure 5:
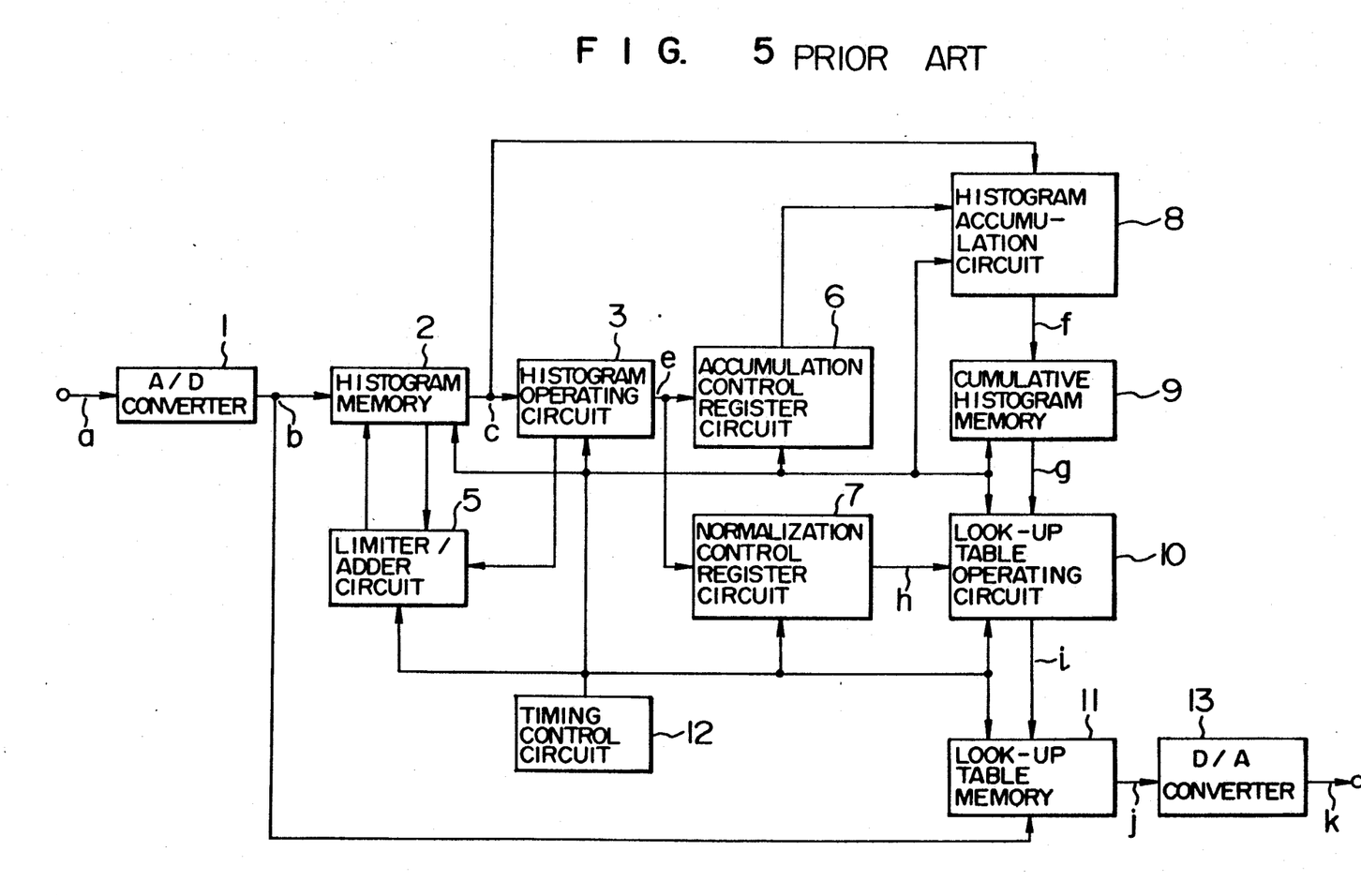
FIG. 5 shows a block diagram of a preceding gradation corrector.

FIG. 5 shows a block diagram of gradation corrector proposed precedently to the present application. In FIG. 5, reference numeral 1 designates an A/D converter for converting an input luminance signal into a digital value. Numeral 2 designates a histogram memory for obtaining a luminance distribution of the input luminance signal. In general, the luminance level enters an address of the memory 2 and the frequency enters as data thereof. Numeral 3 designates a histogram operating circuit for determining the mean value, the mode value, the minimum value, the maximum value, the deviation coefficient, the white area, the black area, etc. of the input luminance signal from the data of the histogram memory 2 and calculating control data of a limiter level, the value of addition, an accumulation start luminance level, an accumulation stop luminance level, the maximum output luminance level and so on from the determined values to output the control values to a limiter/adder circuit 5, an accumulation control register circuit 6 and a normalization control register circuit 7. On the basis of data transferred from the histogram operating circuit 3, the limiter/adder circuit 5 imposes a limitation on the data of the histogram so that it does not exceed a certain level and performs the operation of addition. In general, the data processing performed by the limiter/adder circuit 5 is completed during a time when the address is accessed once. The control data of the accumulation start and stop luminance levels, at which the accumulation is to be started and stopped in determining a cumulative histogram, are supplied from the histogram operating circuit 3 to the accumulation control register circuit 6 which in turn controls a histogram accumulation circuit 8. The histogram accumulation circuit 8 makes the accumulation of processed data from the histogram memory 2 on the basis of a control signal from the accumulation control register circuit 6. Numeral 9 designates a cumulative histogram memory for storing therein the result of accumulation by the histogram accumulation circuit 8. In general, the input luminance level enters an address of the memory 9 and a corrected output luminance level enters as data thereof. In normalizing data of the cumulative histogram to produce a look-up table, the maximum luminance level for an output luminance signal after normalization is supplied from the histogram operating circuit 3 to the normalization control register circuit 7 and the normalization control register circuit 7 controls a normalization coefficient in accordance with the value of the maximum luminance level. Numeral 10 designates a look-up table operating circuit which normalizes the data of the cumulative histogram memory 9 on the basis of an output signal of the normalization control register circuit 7. Numeral 11 designates a look-up table memory for storing therein the data normalized by the look-up table operating circuit 10. In general, the input luminance level enters an address of the memory 11 and the output luminance level enters as data thereof. Numeral 12 designates a timing control circuit which makes the sequencing of various operations and the control for the memories. Numeral 13 designates a D/A converter by which a output luminance signal in digital value corrected by use of the look-up table is converted into an analog value.

Next, explanation will be made of the operation of the gradation corrector having the above construction. FIGS. 6A to 6F show operating waveforms of various parts.

Figure 6A:
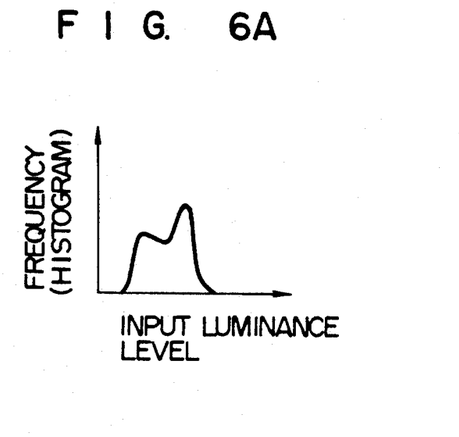
FIGS. 6A to 6F show waveforms for explaining the operation of the preceding gradation corrector.
Figure 6B:
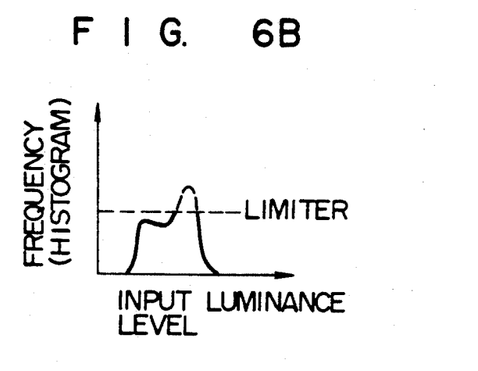

First, an input luminance signal a is inputted to the A/D converter 1 and is converted thereby into a digital value which is in turn outputted as a converted input luminance signal b. The converted input luminance signal b is taken as an address of the histogram memory 2 and data is processed by the limiter/adder circuit 5. By performing this operation during one vertical scanning interval, it is possible to obtain a histogram distribution of the input luminance signal a. The histogram distribution is shown in FIG. 6A.

Next, data of the histogram memory 2 including the histogram distribution is read by the histogram operating circuit 3 which in turn calculates the mean value, the mode value, the minimum value, the maximum value, the deviation coefficient, the white area, the black area, etc. of the input luminance signal. The histogram operating circuit 3 further determines the control data of the limiter level, the value of addition, an accumulation calculation start luminance level, an accumulation calculation stop luminance level, the maximum luminance level after normalization and so on from the result of the above calculation and transfers the determined data to control the limiter/adder circuit 5, the accumulation control register circuit 6 and the normalization control register circuit 7.

Figure 6C:
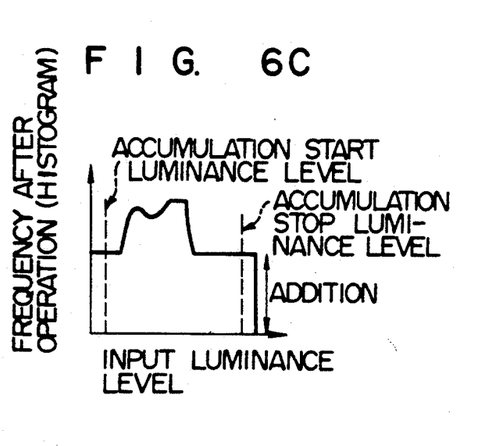
Figure 6D:
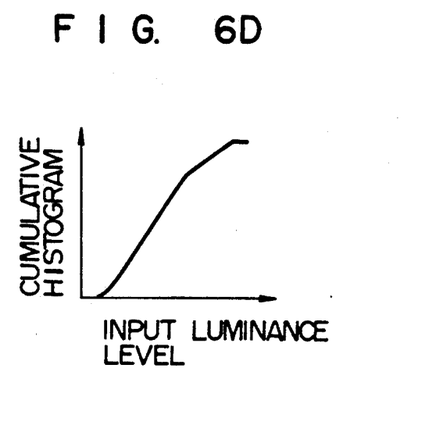

Thereafter, the limiter/adder circuit 5 reads data from the histogram memory 2 to make a limiter (see FIG. 6B) and the operation of addition or the like for each read data on the basis of each data transferred from the histogram operating circuit 3 and outputs the result (or corrected histogram data c) to the histogram accumulation circuit 8 (see FIG. 6C). In the case where the value of addition is fixed, a cumulative curve becomes nearer to a straight line as the value of addition is larger and approaches to a histogram flattening process as the value of addition is smaller (see FIGS. 6C and 6D).

On the basis of the accumulation start luminance level and the accumulation stop luminance level supplied from the accumulation control register circuit 6, the histogram accumulation circuit 8 calculates cumulative histogram data f for the corrected histogram data c in a range between the accumulation start and stop luminance levels and causes the cumulative histogram memory 9 to store the result of calculation.

Figure 6E:
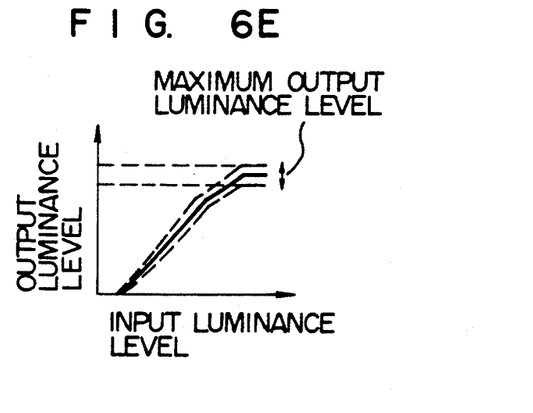

Next, the look-up table operating circuit 10 reads the cumulative histogram data from the cumulative histogram memory 9 to determine a normalization coefficient so that the maximum value of the cumulative histogram data g becomes the maximum output luminance level h supplied from the normalization control register circuit 7. The look-up table operating circuit 10 performs an operation on all the cumulative histogram data g by use of the determined normalization coefficient and causes the look-up table memory 11 to store the result i. If the maximum output luminance level is controlled, an operation such as an automatic contrast control (ACL) or an automatic brightness control (ABL) is possible. Such an operation is shown in FIG. 6E.

Figure 6F:
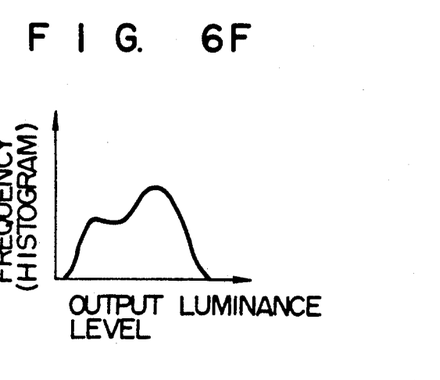

Thereafter, data in the look-up table memory 11 is read with the converted input luminance signal b being used as an address and the read data is outputted as a corrected output luminance signal j. FIG. 6F shows a histogram of the corrected output luminance signal j. The D/A converter 13 outputs the corrected output luminance signal j after convertion thereof into an analog signal k.

The timing control circuit 12 controls the operations of various circuits so that the operations of respective parts are performed at such timings as mentioned above. (For example, refer to Japanese Patent Application No. (Hei)1-265393 (JP-A-3-126,377) entitled "Gradation Corrector" and filed by the applicant of the present application.)

In the above construction of the gradation corrector, however, since each control signal determined by the histogram operating circuit is an instantaneous value determined from the histogram distribution in one vertical scanning interval, there is a problem that the control signal value has a great variation due to noises or the like included in a video signal and the corrected output luminance signal oscillates as a result.

SUMMARY OF THE INVENTION

Objects of the present invention made to solving the above-mentioned problem are to provide a gradation corrector which can make a smooth correction with no oscillation of a corrected output luminance signal and to provide a gradation corrector which can follow a change in video scene with no delay in response.

To that end, a gradation corrector according to a first aspect of the present invention comprises a histogram memory, a histogram operating circuit connected to an output terminal of the histogram memory, a limiter/adder circuit, an accumulation control register circuit and a normalization control register circuit each connected to an output terminal of the histogram operating circuit, a histogram accumulation circuit to which the output terminal of the histogram memory and an output terminal of the accumulation control register circuit are connected, a cumulative histogram memory connected to an output terminal of the histogram accumulation circuit, a look-up table operating circuit to which an output terminal of the cumulative histogram memory and an output terminal of the normalization control register circuit are connected, a look-up table memory for storing the result of operation performed by the look-up table operating circuit, a buffer connected to an output terminal of the histogram memory, a constant-multiplication circuit connected to an output terminal of the buffer, an adder which receives an output signal of the histogram memory and an output signal of the constant-multiplication circuit and has an output terminal connected to an input terminal of the histogram memory, and a timing control circuit.

With the above construction according to the first aspect, a variation of a histogram distribution, which may be caused from noises or the like included in a video signal, can be suppressed, thereby making it possible to realize an excellent gradation corrector in which a corrected signal does not oscillate.

According to a second aspect of the present invention, a gradation corrector comprises a histogram memory, a histogram operating circuit connected to an output terminal of the histogram memory, a limiter/adder circuit, an accumulation control register circuit and a normalization control register circuit each connected to an output terminal of the histogram operating circuit, a histogram accumulation circuit to which the output terminal of the histogram memory and an output terminal of the accumulation control register circuit are connected, a cumulative histogram memory connected to an output terminal of the histogram accumulation circuit, a look-up table operating circuit to which an output terminal of the cumulative histogram memory and an output terminal of the normalization control register circuit are connected, a look-up table memory for storing the result of operation performed by the look-up table operating circuit, a buffer and a video scene change detecting circuit each connected to an output terminal of the histogram memory, a constant-multiplication circuit having an input terminal to which an output terminal of the buffer is connected and a coefficient control terminal to which an output terminal of the video scene change detecting circuit is connected, an adder for receiving an output signal of the histogram memory and an output signal of the constant-multiplication circuit to add them and outputting the result of addition to the histogram memory, and a timing control circuit.

With the above construction according to the second aspect, a delay in output response can be avoided by changing the coefficient of a constant-multiplication in accordance with a change in video scene. As a result, it is possible to realize an excellent gradation corrector which can make a gradation correction following the change in video scene and in which a corrected signal does not oscillate.

According to a third aspect of the present invention, a gradation corrector comprises a histogram memory, a histogram operating circuit connected to an output terminal of the histogram memory, a limiter/adder circuit, an accumulation control register circuit and a normalization control register circuit each connected to an output terminal of the histogram operating circuit, a histogram accumulation circuit to which the output terminal of the histogram memory and an output terminal of the accumulation control register circuit are connected, a cumulative histogram memory connected to an output terminal of the histogram accumulation circuit, a look-up table operating circuit to which an output terminal of the cumulative histogram memory and an output terminal of the normalization control register circuit are connected, an adder for receiving an output signal of the look-up table operating circuit and an output signal of a constant-multiplication circuit to add them, a look-up table memory connected to an output terminal of the adder, the constant-multiplication circuit having an input terminal which is connected to an output terminal of the look-up table memory and an output terminal which is connected to an input terminal of the adder, and a timing control circuit.

With the above construction according to the third aspect a variation of final look-up table data written into the memory can be suppressed even if the instantaneous look-up table data oscillates due to erroneous detection of each control signal. As a result, it is possible to realize an excellent gradation corrector which makes a smooth gradation correction.

According to a fourth aspect of the present invention, a gradation corrector comprises a histogram memory, a histogram operating circuit connected to an output terminal of the histogram memory, a limiter/adder circuit, an accumulation control register circuit and a normalization control register circuit each connected to an output terminal of the histogram operating circuit, a histogram accumulation circuit to which the output terminal of the histogram memory and an output terminal of the accumulation control register circuit are connected, a cumulative histogram memory connected to an output terminal of the histogram accumulation circuit, a look-up table operating circuit to which an output terminal of the cumulative histogram memory and an output terminal of the normalization control register circuit are connected, an adder for receiving an output signal of the look-up table operating circuit and an output signal of a constant-multiplication circuit to add them, a look-up table memory connected to an output terminal of the adder, the constant-multiplication circuit having an input terminal which is connected to an output terminal of the look-up table memory and an output terminal which is connected to an input terminal of the adder, a video scene change detecting circuit having a input terminal which is connected to an output terminal of the look-up table operating circuit and an output terminal which is connected to a coefficient control terminal of the constant-multiplication circuit, a timing control circuit.

With the above construction according to the fourth aspect, it is possible to realize an excellent gradation corrector which can make a gradation correction with no delay in output response can be made by changing the coefficient of a constant-multiplication in accordance with a change in video scene.

In the above construction, data of a histogram distribution used for producing a look-up table data is passed through a recursive filter circuit so that the time constant of a change of the histogram distribution is made large. Thereby, it is possible to suppress a variation of each control signal which may be caused from noises or the like included in an input video signal. As a result, it is possible to prevent the oscillation of a corrected output luminance signal.

Also, by passing data of the look-up table through the recursive filter circuit, a smooth correction with no oscillation of a corrected output luminance signal can be made by virtue of a time constant of a feedback system even if each control signal is erroneously detected due to noises or the like.

Further, by detecting a change in video scene and changing the coefficient of the constant-multiplication circuit of the recursive filter circuit in accordance with the degree of change in video scene, for example, by turning the coefficient to zero when the video scene makes a sudden change, it is possible to avoid a delay in output response.

DESCRIPTION OF THE PREFERRED EMBODIMENTS

Embodiment 1

Figure 1:
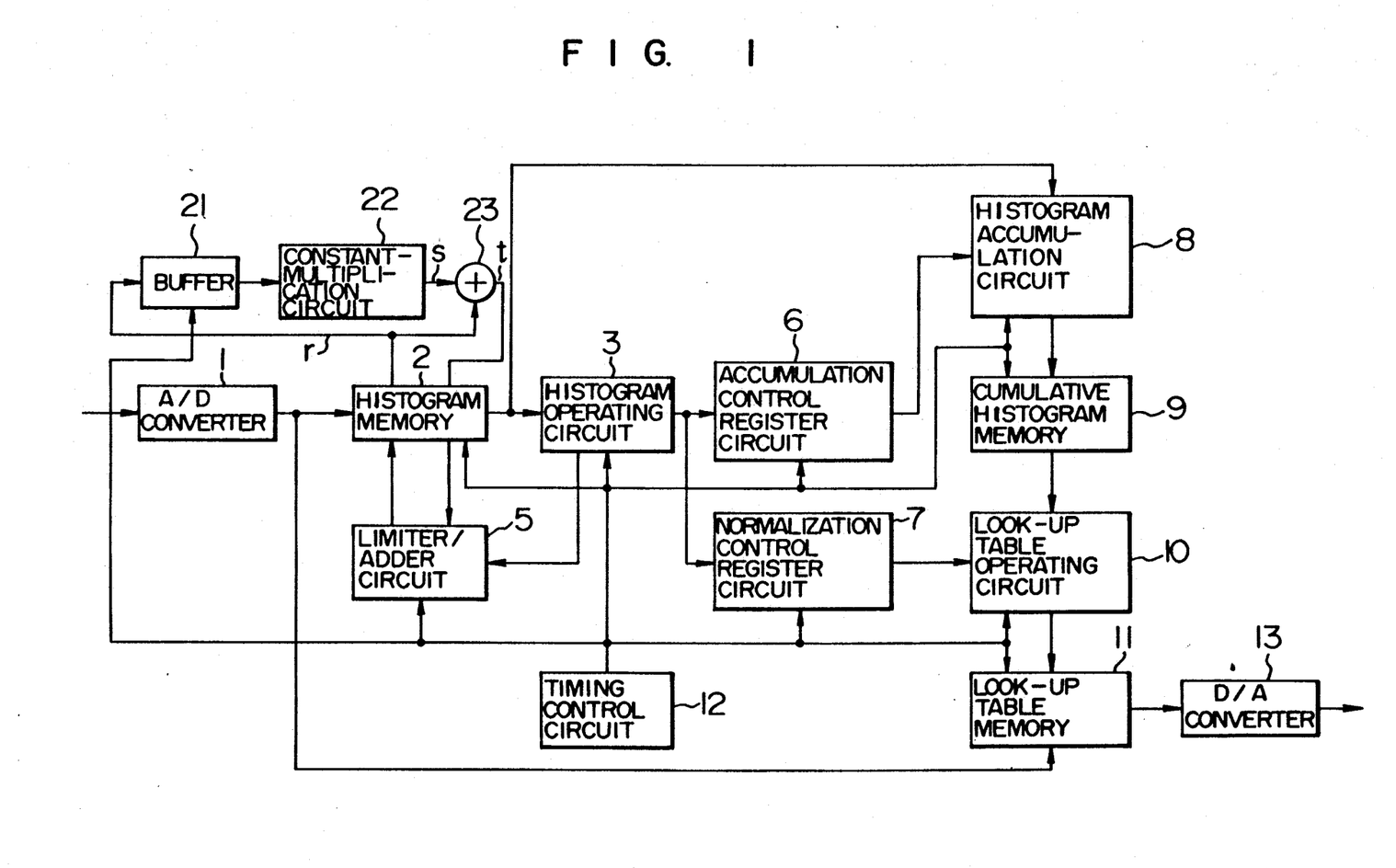
FIG. 1 shows a block diagram of a gradation corrector according to a first embodiment of the present invention.

In FIG. 1 showing a gradation corrector according to a first embodiment of the present invention, reference numerals 1, 2 and 3 designate an A/D converter, a histogram memory and a histogram operating circuit which are the same as those used in the gradation corrector shown in FIG. 5. Numeral 21 designates a buffer which stores histogram data extracted in the preceding vertical scanning interval (or a vertical scanning interval preceding by one interval). Numeral 22 designates a constant-multiplication circuit which multiplies an input signal from the buffer 21 by a certain constant. Numeral 23 designates an adder which adds an output signal of the constant-multiplication circuit 22 and an output signal of the histogram memory 2. The result of addition is outputted to the histogram memory 2. The other circuit construction is similar to that shown in FIG. 5.

Explanation will now be made of the operation of the gradation corrector having the above construction. First, prior to the start of a new sampling in one vertical scanning interval, data having been stored in the histogram memory 2 is transferred into the buffer 21 and then the histogram memory 2 is cleared. Thereafter, the sampling is newly made. After the sampling in one vertical scanning interval has been completed, data of the histogram memory 2 is successively read. The adder 23 adds the read data r and data s which is obtained by multiplying the data read from the buffer 21 corresponding to the data r by the certain constant in the constant-multiplication circuit 22. The result t of addition is written into the histogram memory 2 to update the histogram distribution. Subsequently, each control signal is produced by the histogram operating circuit 3 on the basis of the updated histogram distribution to determine a cumulative histogram and a look-up table.

According to the present embodiment as mentioned above, a variation of a histogram distribution, which may be caused from noises or the like included in an input signal, can be suppressed by providing the buffer 21, the constant-multiplication circuit 22 and the adder 23.

Embodiment 2

Figure 2:
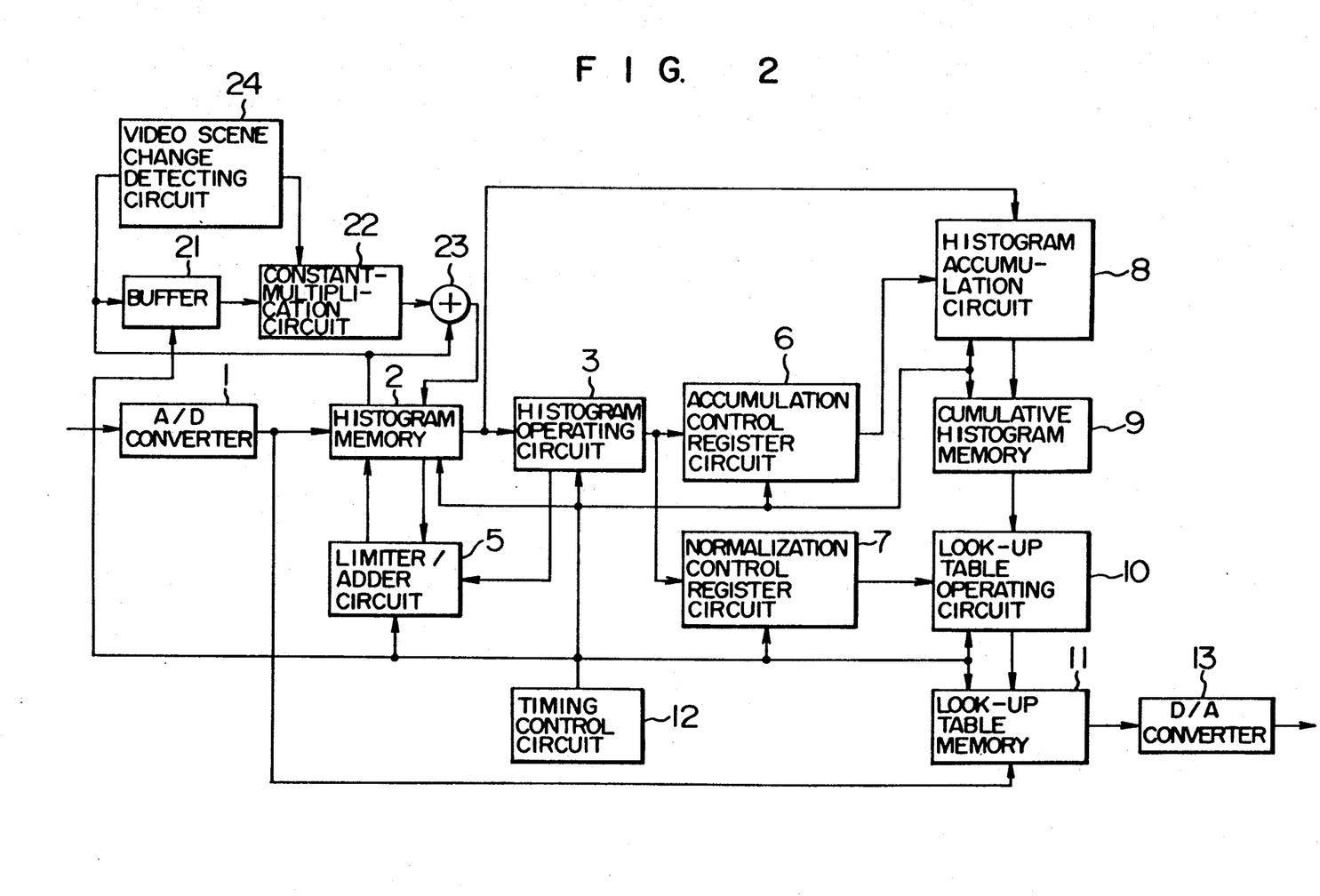
FIG. 2 shows a block diagram of a gradation corrector according to a second embodiment of the present invention.

In FIG. 2 showing a gradation corrector according to a second embodiment of the present invention, reference numerals 2, 21, 22 and 23 designate a histogram memory, a buffer, a constant-multiplication circuit and an adder which are similar to those shown in FIG. 1. The difference from the construction shown in FIG. 1 lies in that a video scene change detecting circuit 24 is provided and an input terminal and an output terminal of the video scene change detecting circuit 24 are connected to an output terminal of the histogram memory 2 and a coefficient control terminal of the constant-multiplication circuit 22, respectively.

The operation of the gradation corrector having the above construction will now be explained. The operation of the present embodiment is basically similar to the operation mentioned in conjunction with the first embodiment but is different therefrom in the following. The minimum value of the previous histogram stored in the buffer 21 and the minimum value of the present histogram stored in the histogram memory 2 are compared with each other by the video scene change detecting circuit 24 and a coefficient of the constant-multiplication circuit 22 is changed in accordance with the magnitude of a difference between both the minimum values. For example, when the difference is large, that is, when a video scene makes a sudden change, the coefficient is turned to zero so that an operation is performed on the basis of an instantaneous histogram distribution stored in the histogram memory 2.

With the above construction in which the buffer 21, the constant-multiplication circuit 22, the adder 23 and the video scene change detecting circuit 24 are provided, a correction with no delay in response of a final output signal can be made by changing the coefficient of a feedback system when the video scene makes a sudden change. In the foregoing, the detection of a change of the video scene in the video scene change detecting circuit 24 has been made from the minimum value. Alternatively, it may be made from the maximum value, the mean value or the like.

Embodiment 3

Figure 3:
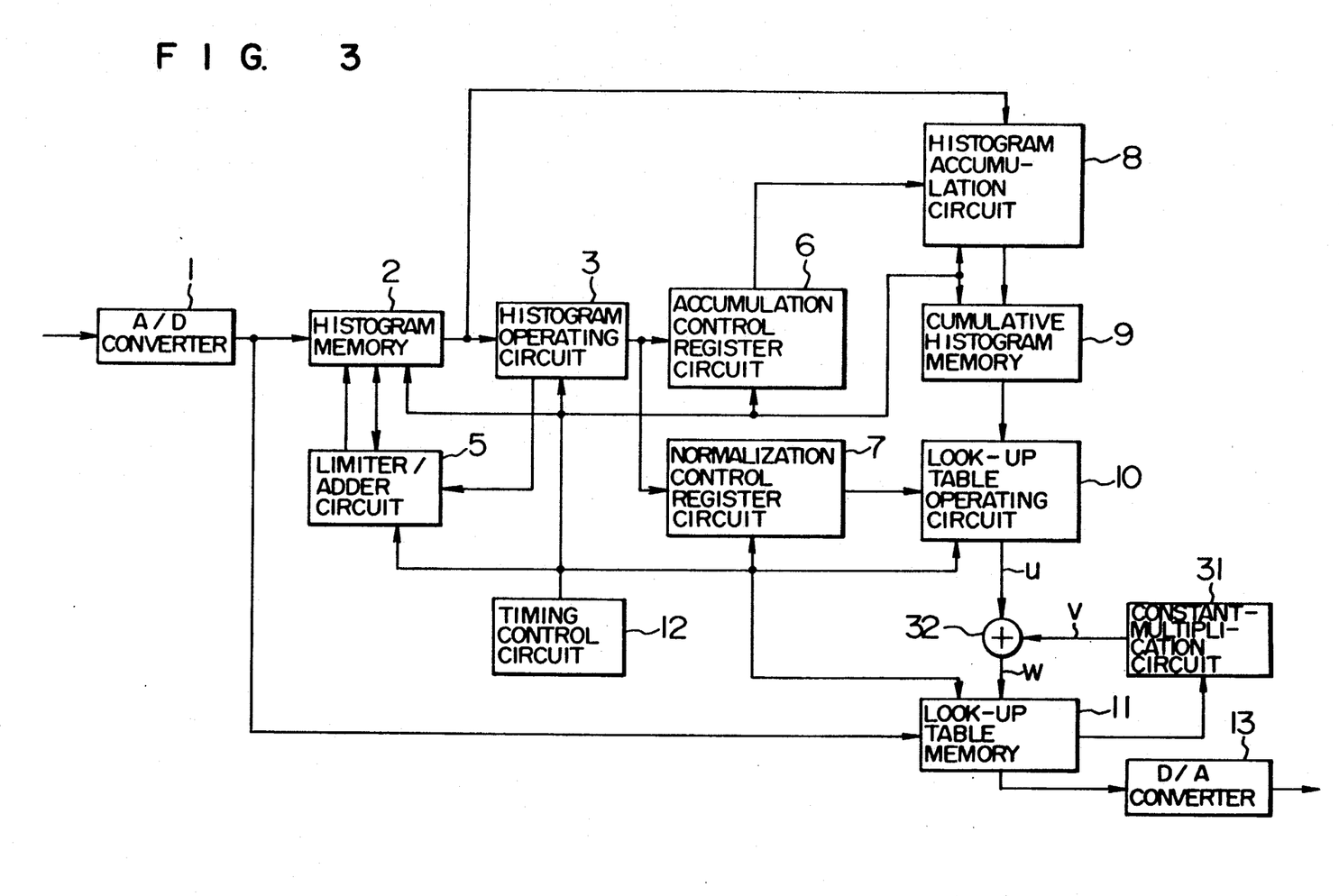
FIG. 3 shows a block diagram of a gradation corrector according to a third embodiment of the present invention.

In FIG. 3 showing a gradation corrector according to a third embodiment of the present invention, reference numerals 10 and 11 designate a look-up table operating circuit and a look-up table memory which are similar to those used in the gradation corrector shown in FIG. 5. Numeral 31 designates a constant-multiplication circuit which multiplies an input signal from the look-up table memory 11 by a certain constant. Numeral 32 designates an adder which adds an output signal of the look-up table operating circuit 10 and an output signal of the constant-multiplication circuit 31. An output signal of the adder 32 is supplied to the look-up table memory 11. The other construction is similar to that shown in FIG. 5.

Explanation will now be made of the operation of the gradation corrector having the above construction. First, data of the look-up table memory 11 is outputted and is multiplied by a certain constant value in the constant-multiplication circuit 31. Next, output data v of the constant-multiplication circuit 31 and data u determined by the look-up table operating circuit 10 are added by the adder 32 and the result w of addition is written into the look-up table memory 11.

With such a construction, the constant-multiplication circuit 31 and the adder 32 form a recursive filter circuit and the oscillation of the look-up table data can be suppressed by virtue of a time constant of the recursive filter circuit.

Embodiment 4

Figure 4:
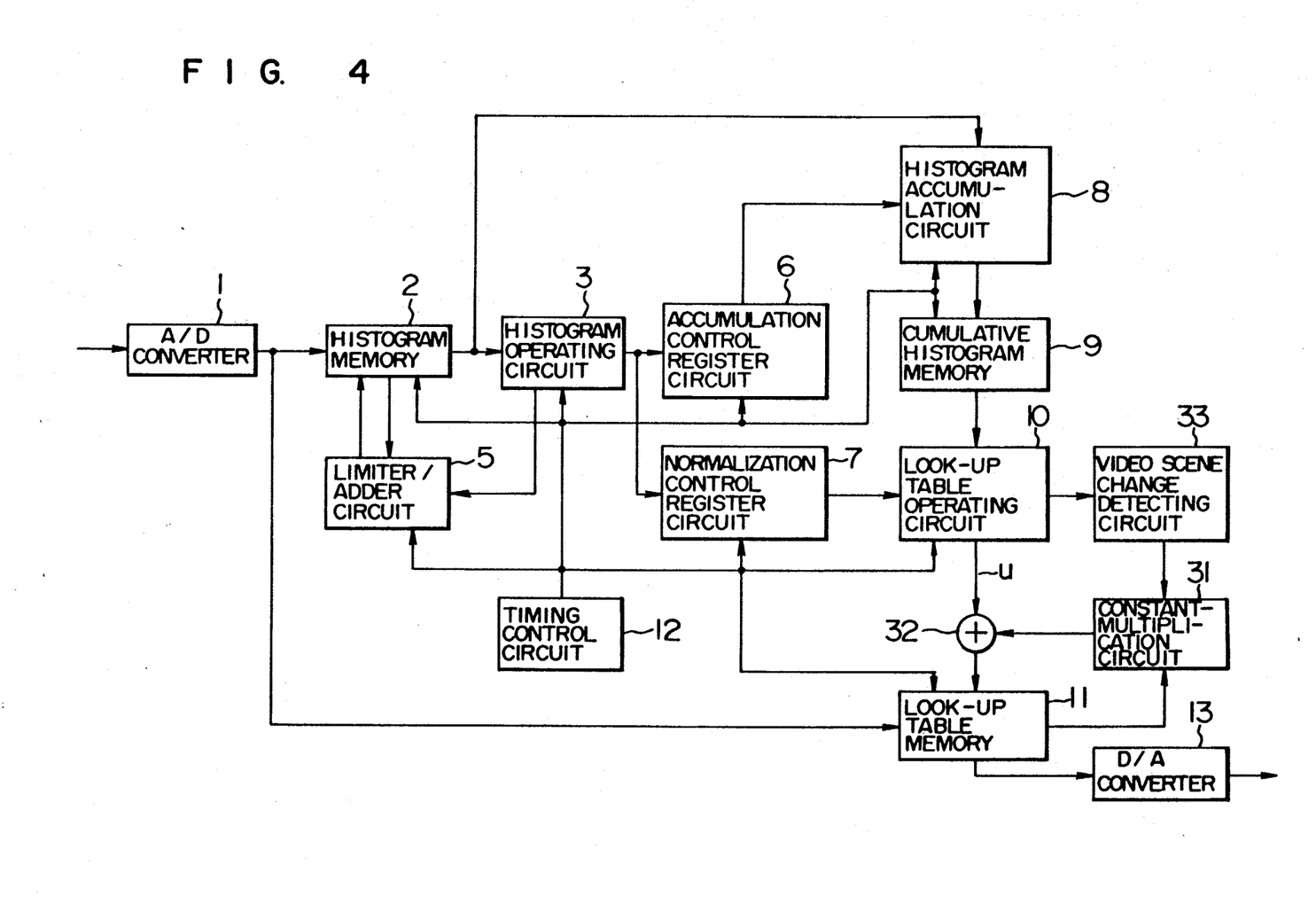
FIG. 4 shows a block diagram of a gradation corrector according to a fourth embodiment of the present invention.

In FIG. 4 showing a gradation corrector according to a fourth embodiment of the present invention, reference numerals 10, 11, 31 and 32 designate a look-up table operating circuit, a look-up table memory, a constant-multiplication circuit and an adder which are similar to those shown in FIG. 3. The difference of the construction of the present embodiment from that of the embodiment shown in FIG. 3 lies in that a video scene change detecting circuit 33 is provided and an input terminal and an output terminal of the video scene change detecting circuit 33 are connected to an output terminal of the look-up table operating circuit 10 and a coefficient control terminal of the constant-multiplication circuit 31, respectively.

The operation of the gradation corrector having the above construction will now be explained. The maximum value of a correction, that is, a difference obtained by the subtraction of a luminance level from a look-up table, determined from the previous histogram and the maximum value of correction determined from the present histogram are compared with each other by the video scene change detecting circuit 33 and a coefficient of the constant-multiplication circuit 31 is changed in accordance with the magnitude of a difference between both the maximum values. For example, when the difference is large, that is, when a video scene makes a sudden change, the coefficient is turned to zero so that an instantaneous value u of the now determined look-up table is written into the look-up table memory 11.

With the above construction in which the constant-multiplication circuit 31, the adder 32 and the video scene change detecting circuit 33 are provided, a correction with no delay in response of a corrected output signal can be made by changing a coefficient of a recursive filter circuit when the video scene makes a sudden change. In the foregoing, the detection of a change of the video scene in the video scene change detecting circuit 33 has been made from the maximum value of a correction. Alternatively, it may be made from the gradient, changing point or the like of a converted curve.

We claim:

1. A gradation corrector comprising a histogram memory for storing a histogram of a video luminance signal, a histogram operating circuit for receiving an output signal of the histogram memory to extract a feature of the histogram from data stored in the histogram memory, a limiter/adder circuit connected to an output terminal of the histogram operating circuit for processing the data of the histogram memory, an accumulation control register circuit and a normalization control register circuit each connected to an output terminal of the histogram operating circuit, a histogram accumulation circuit for receiving an output signal of the histogram memory and an output signal of the accumulation control register circuit to make a cumulative addition for the processed data of the histogram memory, a cumulative histogram memory for storing the result of cumulative addition, a look-up table operating circuit for receiving an output signal of the cumulative histogram memory and an output signal of the normalization control register circuit to normalize data of the cumulative histogram memory, a look-up table memory for storing the result of normalization, a buffer connected to an output terminal of the histogram memory for storing histogram data obtained in a vertical scanning interval preceding by one interval, a constant-multiplication circuit connected to an output terminal of the buffer, an adder for adding output data of the histogram memory and output data of the constant-multiplication circuit and outputting the result of addition to the histogram memory, and a timing control circuit for controlling the above-mentioned circuits.

2. A gradation corrector comprising a histogram memory for storing a histogram of a video luminance signal, a histogram operating circuit for receiving an output signal of the histogram memory to extract a feature of the histogram from data stored in the histogram memory, a limiter/adder circuit connected to an output terminal of the histogram operating circuit for processing the data of the histogram memory, an accumulation control register circuit and a normalization control register circuit each connected to an output terminal of the histogram operating circuit, a histogram accumulation circuit for receiving an output signal of the histogram memory and an output signal of the accumulation control register circuit to make a cumulative addition for the processed data of the histogram memory, a cumulative histogram memory for storing the result of cumulative addition, a look-up table operating circuit for receiving an output signal of.the cumulative histogram memory and an output signal of the normalization control register circuit to normalize data of the cumulative histogram memory, a look-up table memory for storing the result of normalization, a buffer connected to an output terminal of the histogram memory for storing histogram data obtained in a vertical scanning interval preceding by one interval, a video scene change detecting circuit connected to the output terminal of the histogram memory for detecting a change in video scene, a constant multiplication circuit connected to an output terminal of the buffer and the coefficient of which is changed by an output signal of the video scene change detecting circuit, an adder for adding output data of the histogram memory an output data of the constant-multiplication circuit and outputting the result of addition to the histogram memory, and a timing control circuit.

3. A gradation corrector comprising a histogram memory for storing a histogram of a video luminance signal, a histogram operating circuit for receiving an output signal of the histogram memory to extract a feature of the histogram from data stored in the histogram memory, a limiter/adder circuit connected to an output terminal of the histogram operating circuit of processing the data of the histogram memory, an accumulation control register circuit and a normalization control register circuit each connected to an output terminal of the histogram operating circuit, a histogram accumulation circuit for receiving an output signal of the histogram memory and an output signal of the accumulation control register circuit to make a cumulative addition for the processed data of the histogram memory, a cumulative histogram memory for storing the result of cumulative addition, a look-up table operating circuit for receiving an output signal of the cumulative histogram memory and an output signal f the normalization control register circuit to normalize data of the cumulative histogram memory, an adder for adding output data of the look-up table operating circuit and output data of a constant-multiplication circuit, a look-up table memory for storing output data of the adder, the constant-multiplication circuit for multiplying data of the look-up table memory by a constant and outputting the result of multiplication to the adder, and a timing control circuit.

4. A gradation corrector comprising a histogram memory for storing a histogram of a video luminance signal, a histogram operating circuit for receiving an output signal of the histogram memory to extract a feature of the histogram form data stored in the histogram memory, a limiter/adder circuit connected to an output terminal of the histogram operating circuit for processing the data of the histogram memory, an accumulation control register circuit and a normalization control register circuit teach connected to an output terminal of the histogram operating circuit, a histogram accumulation circuit for receiving an output signal of the histogram memory and an output signal of the accumulation control register circuit to make a cumulative addition for the processed data of the histogram memory, a cumulative histogram memory for storing the result of cumulative addition, a look-up table operating circuit for receiving an output signal of the cumulative histogram memory and an output signal of the normalization control register circuit to normalize data of the cumulative histogram memory, an adder for adding output data of the look-up tale operating circuit and output data of a constant-multiplication circuit, a look-up table memory for storing output data of the adder, a video scene change detecting circuit connected to an output terminal of the look-up table operating circuit for detecting a change in video scene, the constant-multiplication circuit for multiplying data of the look-up table memory by a constant and the coefficient of which is changed by an output signal of the video scene change detecting circuit and outputting the result of multiplication to the adder, an a timing control circuit.

* * * * *